United States Patent
Jenson

(10) Patent No.: US 9,380,065 B2
(45) Date of Patent: Jun. 28, 2016

(54) SYSTEMS AND METHODS FOR IDENTIFYING ILLEGITIMATE ACTIVITIES BASED ON HISTORICAL DATA

(71) Applicant: Facebook, Inc., Menlo Park, CA (US)

(72) Inventor: Daniel Adam Jenson, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 79 days.

(21) Appl. No.: 14/206,180

(22) Filed: Mar. 12, 2014

(65) Prior Publication Data

US 2015/0264063 A1 Sep. 17, 2015

(51) Int. Cl.
*H04L 29/06* (2006.01)
*G06N 5/02* (2006.01)

(52) U.S. Cl.
CPC ............. *H04L 63/1408* (2013.01); *G06N 5/02* (2013.01); *H04L 63/1425* (2013.01)

(58) Field of Classification Search
CPC ............ H04L 63/1416; H04L 63/1408; H04L 63/145; H04L 63/1441; H04L 63/1458; H04L 63/1425
See application file for complete search history.

(56) References Cited

U.S. PATENT DOCUMENTS

| | | | | |
|---|---|---|---|---|
| 8,472,728 | B1 * | 6/2013 | Chau et al. | 382/226 |
| 2012/0066125 | A1 * | 3/2012 | Ma et al. | 705/44 |
| 2012/0130771 | A1 * | 5/2012 | Kannan et al. | 705/7.32 |
| 2012/0310376 | A1 * | 12/2012 | Krumm et al. | 700/31 |
| 2013/0191261 | A1 * | 7/2013 | Chandler | G06Q 40/025 705/35 |

* cited by examiner

*Primary Examiner* — Chau Le
*Assistant Examiner* — Ghodrat Jamshidi
(74) *Attorney, Agent, or Firm* — Sheppard Mullin Richter & Hampton LLP

(57) ABSTRACT

Systems, methods, and non-transitory computer-readable media can acquire historical data including a plurality of features associated with known legitimate activities and with known illegitimate activities. A machine learning technique can be applied to the historical data to gain information about the plurality of features associated with the known legitimate activities and with the known illegitimate activities. A decision tree can be generated based on at least a portion of the information about the plurality of features. A node in the decision tree that satisfies specified precision criteria can be identified. A rule can be created based on the node. One or more illegitimate activities can be identified based on the rule.

17 Claims, 12 Drawing Sheets

400

| Activity | FrequentIPCountry (FIP) | ... |
|---|---|---|
| 1 | Canada (CA) | |
| 2 | United States (US) | |
| 3 | Turkey (TR) | |
| 4 | Canada (CA) | |
| 5 | United States (US) | |

⋮

450

| Activity | FIP_US | FIP_CA | FIP_TR | ... |
|---|---|---|---|---|
| 1 | 0 | 1 | 0 | |
| 2 | 1 | 0 | 0 | |
| 3 | 0 | 0 | 1 | |
| 4 | 0 | 1 | 0 | |
| 5 | 1 | 0 | 0 | |

| ACTIVITY | ⋯ FEATURE X | FEATURE Y ⋯ | ILLEGITIMACY |
|---|---|---|---|
| Activity 01 | 0.4 | 0.7 | 1 |
| Activity 02 | 3.5 | 3.1 | 0 |
| Activity 03 | 1.6 | 0.3 | 0 |
| Activity 04 | 0.7 | 1.5 | 1 |
| Activity 05 | 1.8 | 1.2 | 0 |
| Activity 06 | 2.5 | 2.9 | 0 |
| Activity 07 | 3.1 | 2.6 | 1 |
| Activity 08 | 2.9 | 1.3 | 0 |
| Activity 09 | 3.3 | 1.8 | 0 |
| Activity 10 | 0.4 | 3.2 | 1 |
| Activity 11 | 2.3 | 0.9 | 1 |
| Activity 12 | 3.1 | 0.8 | 1 |
| Activity 13 | 1.2 | 3.4 | 0 |
| Activity 14 | 0.2 | 2.1 | 1 |
| Activity 15 | 1.9 | 2.4 | 0 |
| Activity 16 | 2.6 | 3.7 | 0 |
| ⋮ | | | |

FIGURE 6A

SYSTEMS AND METHODS FOR IDENTIFYING ILLEGITIMATE ACTIVITIES BASED ON HISTORICAL DATA

FIELD OF THE INVENTION

The present technology relates to the field of identifying illegitimate activities. More particularly, the present technology provides techniques for identifying illegitimate activities in networked environments based on historical data.

BACKGROUND

Today, people often interact with networked environments. Many users of computing devices frequently browse web sites, access online media content, or otherwise use network services. Users with access to the Internet can perform online shopping, watch streaming movies, download software, and utilize social networking services. In one example, a user of a social networking service can purchase applications (e.g., games), give gifts (e.g., gift cards), publish advertisements, distribute promotions, or conduct various other transactions. To fund various transactions, the user can provide his or her payment information (e.g., credit card information, bank account information) to the social network service. However, occasionally, another user can attempt to illegitimately (e.g., fraudulently) gain access to the user's payment information or otherwise compromise the user's legitimate account with the social networking service.

In another example, a user of an online resource, such as a shopping website or an online media service, can participate in various activities that involve the use of financial instruments compatible or operable with the online resource. However, in some cases, the financial instruments of the user can be stolen, illegitimately used, or otherwise compromised. These and other similar concerns can reduce the overall user experience associated with using financial instruments in networked environments.

SUMMARY

Various embodiments of the present disclosure can include systems, methods, and non-transitory computer readable media configured to identify illegitimate activities based on historical data. In some embodiments, historical data including a plurality of features associated with known legitimate activities and with known illegitimate activities can be acquired. A machine learning technique can be applied to the historical data to gain information about the plurality of features. A decision tree can be generated based on at least a portion of the information about the plurality of features. A node in the decision tree that satisfies specified precision criteria can be identified. A rule can be created based on the node. One or more illegitimate activities can be identified based on the rule.

In one embodiment, applying the machine learning technique to the acquired historical data to gain the information about the plurality of features can further comprise determining a respective information gain for each feature in the plurality of features. A feature having a highest information gain can be identified. Then a feature value, for the feature, can be selected. The selected feature value can partition the historical data into a first data subset and a second data subset, wherein the feature value is selected such that a largest possible amount of known legitimate activities is in the first data subset and a largest possible amount of known illegitimate activities is in the second data subset.

In one embodiment, the first data subset is associated with feature values less than the feature value that partitions the historical data and the second data subset is associated with feature values greater than the feature value that partitions the historical data. In one embodiment, the first data subset is associated with feature values greater than the feature value that partitions the historical data and the second data subset is associated with feature values less than the feature value that partitions the historical data.

In one embodiment, generating the decision tree based on at least the portion of the information about the plurality of features can further comprise generating a next highest node in the decision tree. The next highest node can be associated with the feature having the highest information gain. A first child node, of the next highest node, can be generated to represent the first data subset, and a second child, of the next highest node, can be generated to represent the second data subset.

In one embodiment, a first percentage, of known illegitimate activities in the first data subset relative to total activities in the first data subset, can be determined. The first child node can be associated with the first percentage. A second percentage, of known illegitimate activities in the second data subset relative to total activities in the second data subset, can be determined. The second child node can be associated with the second percentage.

In one embodiment, identifying the node in the decision tree that satisfies the specified precision criteria can further comprise selecting a node that is associated with a percentage, of known illegitimate activities in a data subset represented by the node relative to total activities in the data subset, that at least meets a threshold metric indicated by the specified precision criteria. In one embodiment, the threshold metric can correspond to 90%.

In one embodiment, creating the rule based on the node can further comprise determining a path in the decision tree leading to the node, wherein the rule is created based on information about each node in the path in the decision tree leading to the node.

In one embodiment, the machine learning technique can be associated with at least one of an information gain technique, a classification technique, a clustering technique, a decision tree classifier technique, a decision tree learning technique, a random forest technique, a logistic regression technique, a linear regression technique, or a gradient boosting technique.

In one embodiment, one or more input parameters can be received prior to acquiring the historical data. A query can be generated based on the one or more input parameters, wherein the historical data is acquired using the query.

In one embodiment, the historical data can be acquired based on a historical data context indicated by at least one of the one or more input parameters. In one embodiment, the plurality of features included in the historical data can be selected based on at least one of the one or more input parameters.

In one embodiment, the historical data can be formatted to be operable with the machine learning technique, prior to applying the machine learning technique to the historical data.

In one embodiment, the one or more illegitimate activities can be associated with one or more fraudulent transactions occurring in a networked environment.

Many other features and embodiments of the invention will be apparent from the accompanying drawings and from the following detailed description.

BRIEF DESCRIPTION OF THE DRAWINGS

FIG. 4 illustrates an example scenario of data formatting performed by the data formatting module shown in FIG. 3, according to an embodiment of the present disclosure.

FIG. 6A illustrates example data which can be utilized by the example tree generating module shown in FIG. 5, according to an embodiment of the present disclosure.

Figure 1:
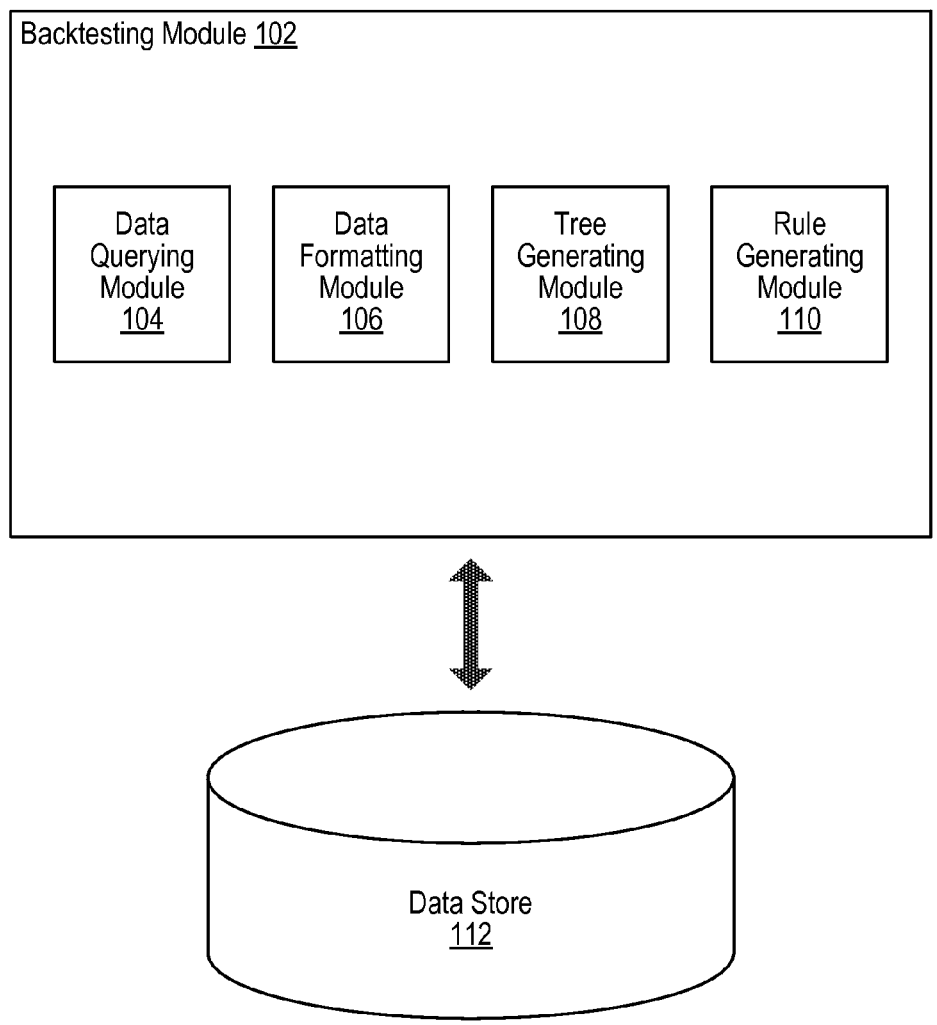
FIG. 1 illustrates an example system including an example backtesting module configured to facilitate identifying illegitimate activities based on historical data, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Identifying Illegitimate Activities

People often conduct transactions or engage in activities that involve the use of financial instruments, such as credit cards, bank accounts, electronic or digital payment services, etc. When users of computing devices utilize use financial instruments in a networked environment (e.g., Internet, cellular data network, online service, etc.), the users must often provide information about their financial instruments. In some cases, illegitimate users can attempt to steal information about financial instruments of legitimate online service users. In some cases, an illegitimate user can attempt to link a stolen financial instrument with a legitimate user's online service account.

Conventional approaches to detecting, reducing, or preventing illegitimate activities (and/or illegitimate users) include manually reviewing the activities, such as by scrutinizing characteristics or traits associated with the activities, to determine patterns or trends that are frequently found to be linked to illegitimate users or activities. Upon determining the patterns or trends, rules for identifying illegitimate activities can be manually created. However, conventional approaches are generally time-consuming and require significant manual resources.

Various embodiments of the present disclosure can utilize backtesting to identify (i.e., detect, determine, classify, etc.) illegitimate activities including, but not limited to, fraudulent transactions, events, actions, and users, without requiring significant manual resources or time. In general, backtesting can refer to a process of testing a strategy and/or predictive model based on historic data. For example, various embodiments of the present disclosure can analyze known or existing historical data to build rules for identifying unclassified activities (e.g., transactions, events, users, etc.) that are likely to be illegitimate or fraudulent.

FIG. 1 illustrates an example system 100 including an example backtesting module 102 configured to facilitate identifying illegitimate activities based on historical data, according to an embodiment of the present disclosure. As shown in FIG. 1, the example backtesting module 102 can comprise a data querying module 104, a data formatting module 106, a tree generating module 108, and a rule generating module 110.

The example system 100 can also include at least one data store 112. In the example of FIG. 1, the at least one data store 112 can be configured to store data such as historical data. For example, historical data can include information that is related to or associated with activities that are known to be legitimate or illegitimate. The information can include a plurality of features associated with the known legitimate activities and with the known illegitimate activities.

In some cases, features can correspond to attributes, traits, characteristics, properties, and/or details, etc., associated with the activities. The quantity and/or types of features can be defined, determined, preset, and/or preconfigured, etc. Further, each activity can have a respective value for each feature in the plurality of features. An activity's value for a particular feature (i.e., a feature value) can describe the activity with respect to the particular feature. The feature values for the plurality of features can be calculated for each activity when the activity occurs (or within an allowable time deviation from when the activity occurs).

In one example, an activity can correspond to a purchase of an advertisement to be promoted via a social networking service. In this example, a first feature (e.g., DistanceBetweenPurchaseAndIPCountry) about the activity can indicate whether or not a location of where the advertisement purchase was made (i.e., source location) matches or is substantially close in proximity to a location at which the advertisement is to be promoted (i.e., target location). For example, if the source location is Istanbul, Turkey and the target location is San Francisco, Calif., then the feature value for the first feature can be a high value (or score), which can represent a greater distance. If the source location is Los Angeles, Calif. and the target location is Arizona, Calif., then the feature value for the first feature can be a lower value. If the source location and the target location are both New York, N.Y., then the feature value for the first feature can be an even lower value (to represent a closer distance).

Continuing with the example, a second feature associated with the activity can provide information about an advertisement account related to the activity. The second feature can indicate a (current) status of the advertisement account at the time when the activity occurred. For example, if the activity occurred via an advertisement account that had been inactive or unused for a long time, then the feature value (or score) for the second feature for the activity can be a low value. If, for example, the activity occurred using an account that was frequently used, then the feature value for the second feature can be higher. The feature value for the second feature associated with the activity can further increase, for example, if the activity occurred via an account that was frequently used and in good standing (e.g., balance is paid off). It is contemplated that there can be numerous other variations. For example, as discussed above, there can be a wide variety of features and the quantity of features can vary as well. The features can represent different aspects of activities and/or provide various types information about the activities.

Moreover, activities can be considered known legitimate activities or known illegitimate activities based on review or other validation processes. In one example, previous or historical activities can be reviewed and analyzed manually to determine whether each of the activities is legitimate or illegitimate. In another example, a previous activity can be known to be illegitimate if a user supposedly associated with the activity reports or asserts that the user did not partake in the activity. In a further example, an activity can be known to be illegitimate if a financial institution associated with the activity (e.g., credit card company, bank, electronic payment company, etc.) makes a report or requests a refund. There can be various other approaches to verifying, determining, classifying, acquiring, and/or producing known legitimate activities or known illegitimate activities.

Utilizing information about the known legitimate activities and known illegitimate activities included in the historical data, various embodiments of the present disclosure can identify unknown activities as likely being illegitimate (or legitimate). With reference to FIG. 1, the backtesting module 102 can facilitate identifying illegitimate activities based on historical data.

In one example, the data querying module 104 can query the at least one data store 112 to acquire historical data. The historical data can include a plurality of features about or associated with known legitimate activities and known illegitimate activities. Then the data formatting module 106 can format the historical data acquired from the data store 112, such that the formatted historical data can be further processed. One or more machine learning techniques can be applied with respect to the formatted historical data to gain or derive information about the plurality of features. The tree generating module 108 can generate a decision tree based, in part, on at least a portion of the gained or derived information about the plurality of features. One or more rules for identifying (e.g., detecting, determining, defining, classifying, etc.) illegitimate activities, that have yet to be classified or identified, can be created based on the decision tree. In some implementations, an identified illegitimate activity (identified using the one or more rules) can be considered a known illegitimate activity, thus resulting in the historical data being able to grow and change over time. More detailed discussions about the modules and their operations and functions are provided below.

Figure 2:
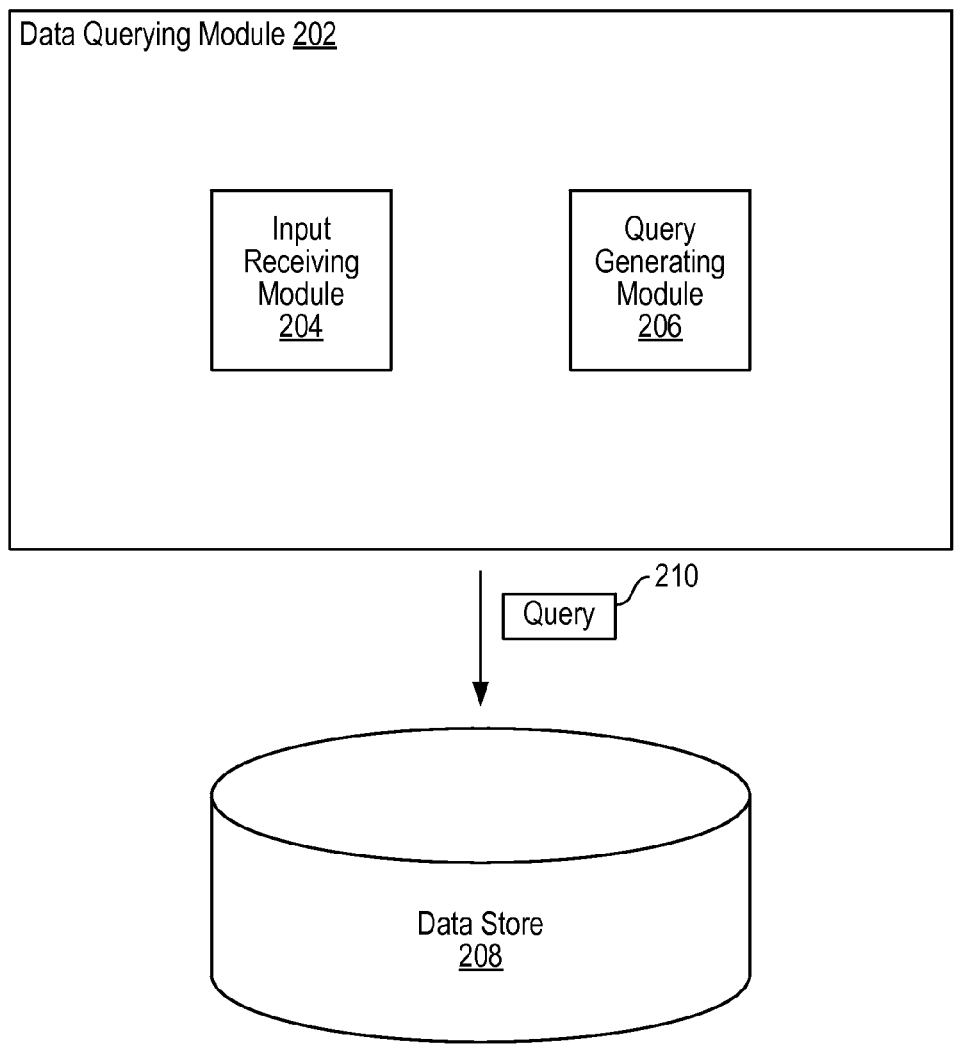
FIG. 2 illustrates an example data querying module shown in FIG. 1, according to an embodiment of the present disclosure.

With reference to FIG. 2, an example data querying module 202, as shown in FIG. 1 (e.g., 104), can be illustrated, according to an embodiment of the present disclosure. The example data querying module 202 can query historical data, which can be stored in at least one data store 208 (e.g., the data store 112 in FIG. 1).

In some embodiments, the data querying module 202 can comprise an input receiving module 204. The input receiving module 204 can be configured to receive (or acquire) one or more input parameters. The one or more input parameters can be received prior to querying for and/or acquiring the historical data. In some instances, the input parameter(s) can be received from or provided by a user. In some cases, the input parameter(s) can correspond to default parameters that are preset or preconfigured. The input parameter(s) can assist in determining (and narrowing) the scope of the historical data to be acquired.

In one example, the input parameter(s) can specify a range of time with respect to the historical data to be acquired. The input parameter(s) can cause the data querying module 104 to acquire only historical data associated with activities that fall within the range of time. In another example, the input parameter(s) can specify that only activities associated with a particular matter (e.g., a particular application, a particular type of applications, a particular user, a particular group of users, etc.) are to be included in the acquired historical data. In another example, the input parameter(s) can cause the data query module 104 to acquire historical data based on one or more locations specified by the input parameter(s). In a further example, the input parameter(s) can specify a context for the historical data to be acquired. In another example, the input parameter(s) can specify a set of features to be included for the historical data to be acquired. Further, various input parameters can be utilized in any combination (e.g., individually, collectively, etc.) to determine the scope of the historical data to be acquired. It should also be noted that the previous example input parameters are discussed for illustrative purposes and that many other input parameters can be used with the various embodiments of the present disclosure.

Moreover, in some embodiments, the data querying module 202 can comprise a query generating module 206. In some embodiments, the input receiving module 204 can correspond to an interface for the query generating module 206. For example, in some implementations, the query generating module 206 can comprise the input receiving module 204 as an interface for receiving input. The query generating module 206 can be configured to generate a query 210 based on the one or more input parameters received by the input receiving module 202. In one example, the query 210 can be written in Structured Query Language (SQL). However, various other suitable languages or formats can be utilized for the query 210.

The query generating module 206 can generate a query 210 that incorporates the terms and/or conditions specified by the one or more input parameters. The query 210 can assist in determining (or narrowing) the scope of the historical data to be acquired from the data store 208. For example, the data querying module 202 can use the query 210 to acquire a particular set of historical data. As such, the historical data acquired can be dependent upon the query 210 (and thus dependent upon the one or more input parameters).

Figure 3:
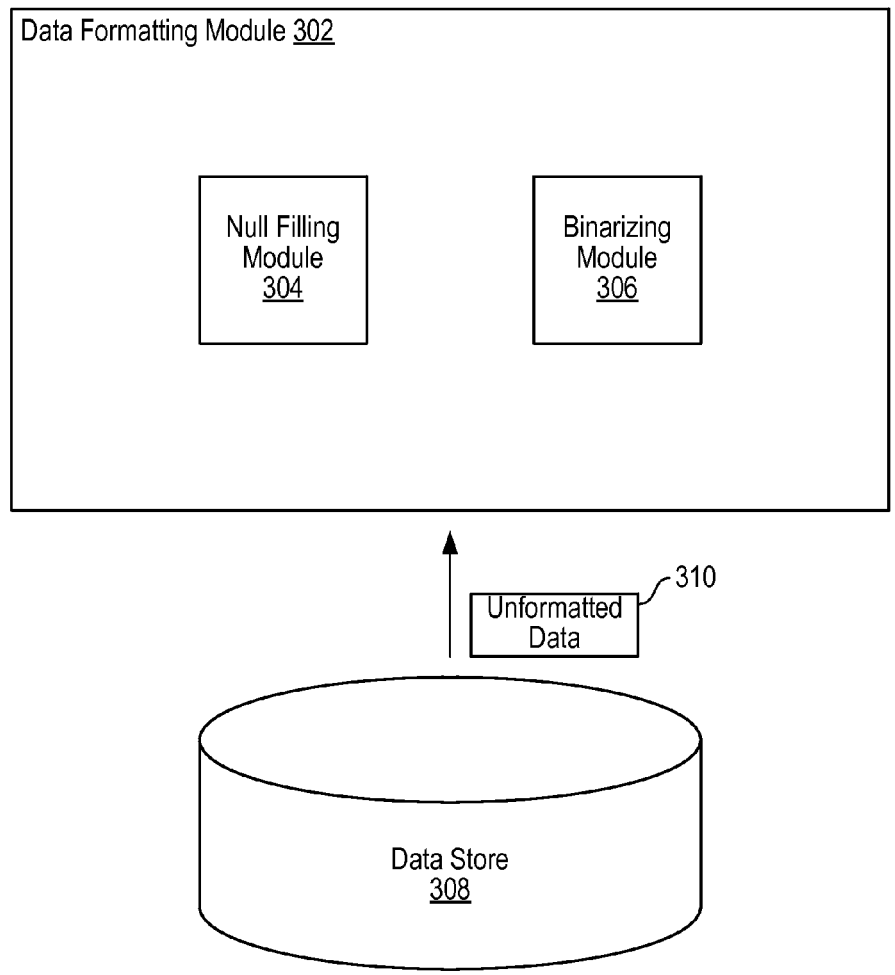
FIG. 3 illustrates an example data formatting module shown in FIG. 1, according to an embodiment of the present disclosure.

FIG. 3 illustrates an example data formatting module 302 shown in FIG. 1 (e.g., the data formatting module 106), according to an embodiment of the present disclosure. The data formatting module 302 can format or otherwise modify unformatted historical data 310 acquired from at least one data store 308 (e.g., the data store 112 in FIG. 1, the data store 208 in FIG. 2). The data formatting module 302 can format the unformatted historical data 310 to produce formatted historical data that is compatible with (e.g., operable with, readable by, capable of being analyzed by, etc.) further processing.

In some implementations, the data formatting module 106 can be configured to format column names of the unformatted data 310. The data formatting module 106 can be configured to cast correct data types for each feature. In some cases, fully null columns (if any) within the unformatted data 310 can be removed or ignored. In some instances, if a column has only one unique value (null or otherwise), the column can be considered "useless" for modeling and thus can be dropped.

As such, in some embodiments, there can be a function to drop single unique values, a function to drop "useless" columns, and/or a function to drop non-information gaining features. Further, missing data can be filled by the data formatting module 106. The data formatting module 106 can further add user-specified calculated columns. Moreover, the data formatting module 106 can be configured to apply user-specified transformations (e.g., replace a feature with its rank as determined by a parameter such as fraud rate). Furthermore, the data formatting module 106 can optionally (e.g., based on user commands) binarize categorical values.

In some embodiments, the process of formatting the unformatted data 310 can include filling in null (or void) values (e.g., <NULL>, −1) within the unformatted data 310. As such, in some cases, the data formatting module 302 can comprise a null filling module 304. The null filling module 304 can be configured to fill in any null values or variables included in the unformatted data 310. In one example, the unformatted historical data 310 can include a feature value for a feature associated with an activity. In this example, the feature value for the feature can correspond to a null value. As such, the null filling module 304 can, for example, modify the null feature value to change it to a "0" value. Other approaches to filling in null values are possible as well.

In some embodiments, the process of formatting the unformatted data 310 can include binarizing non-binary values present within the unformatted data 310. Binarizing a non-binary value can refer to a process of representing a non-binary value as a binary value. In some implementations, the data formatting module 302 can comprise a binarizing module 306. The binarizing module 306 can be configured to format or modify non-binary values (i.e., values that are not already binary) to be understood as binary values. For example, the binarizing module 306 can enable a ternary value to be binarized as a binary value. A more detailed discussion of binarizing multiary (non-binary) values is discussed below with reference to FIG. 4.

FIG. 4 illustrates an example scenario of data formatting performed by the data formatting module shown in FIG. 3 (e.g., the data formatting module 302), according to an embodiment of the present disclosure. FIG. 4 illustrates an example unformatted portion 400 of data (e.g., historical data), from which an example formatted portion 450 of the data can be produced.

In the example of FIG. 4, the unformatted portion 400 of data can be acquired from at least one data store (not explicitly illustrated in FIG. 4). In this example, the unformatted data portion 400 can include a feature that specifies a location (e.g., Internet Protocol (IP) location, country, etc.) with which an activity is frequently associated. In this example, the feature can be labeled "FrequentIPCountry" or "FIP." The feature values for the feature can include "Canada (CA)," "United States (US)," and "Turkey (TR)," etc. Since these feature values for the feature are not in a binary form, the feature is non-binary. Non-binary values might not be compatible with (e.g., operable with, readable by) further processing.

As discussed above, unformatted data can be formatted or otherwise modified to produce formatted data. In the example scenario of FIG. 4, the formatting of the unformatted, non-binary data portion 400 can include binarizing the non-binary data portion 400 to produce the formatted, binarized data portion 450.

In this example, the formatting process can analyze the non-binary feature FrequentIPCountry (FIP) to identify its possible feature values. The possible feature values for the FIP feature can include Canada (CA), United States (US), and Turkey (TR). A new data record portion (e.g., column) can then be allocated for each of the possible feature values. For example, the data record portion (e.g., column) "FIP_CA" can indicate whether or not an activity is frequently associated with Canada (CA), whereas the data record portion "FIP_US" can indicate whether or not an activity is frequently associated with the United States (US). Likewise, the data record portion "FIP_TR" can indicate whether or not an activity is frequently associated with Turkey (TR).

Continuing with the example, the unformatted and non-binary FrequentIPCountry (FIP) feature value for Activity 1 is Canada (CA). Accordingly, each of the FIP_US and FIP_TR values for Activity 1 is 0 (or false, negative, etc.), while the FIP_CA value is 1 (or true, affirmative, etc.). Similarly, the unformatted FIP feature value for Activity 2 is United States (US). As such, the FIP_CA and FIP_TR values for Activity 2 are 0, but the FIP_US value is 1. Likewise, for Activity 3, the FIP_US and FIP_CA values are 0, but the FIP_TR value is 1. Further, Activity 4 has FIP_US and FIP_TR values of 0, but an FIP_CA value of 1. Lastly, Activity 5 has an FIP_US value of 1, and FIP_CA and FIP_TR values of 0. Therefore, the data portion 450 is binarized and can be compatible (e.g., operable, readable, etc.) with further processing.

It should be noted that the previous discussions regarding formatting data and binarizing data are for illustrative purposes. It is contemplated that, in some cases, data might not need to be formatted or binarized to be compatible with further processing.

Figure 5:
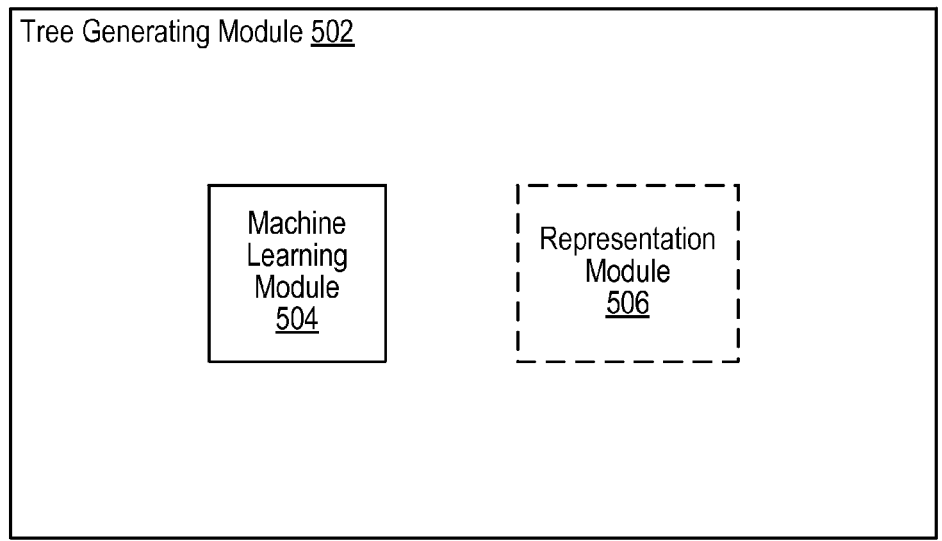
FIG. 5 illustrates an example tree generating module shown in FIG. 1, according to an embodiment of the present disclosure.

FIG. 5 illustrates an example tree generating module 502 shown in FIG. 1 (e.g., the tree generating module 108), according to an embodiment of the present disclosure. The tree generating module 502 can, for example, analyze acquired data to generate a tree structure based on the analysis of the data. For example, one or more machine learning techniques can be applied to the acquired (and formatted) historical data to gain (or derive) information about a plurality of features included in the historical data. The information gained (or derived) from applying the one or more machine learning techniques can correspond to a process of generating a decision tree, performed by the tree generating module 502. In some embodiments, the decision tree can be defined by its use of information gain or entropy as a machine learning technique/algorithm. The decision tree can be used to create one or more rules for identifying (unknown, unclassified, unidentified, unverified, future, etc.) activities.

In some embodiments, the tree generating module 502 can comprise a machine learning module 504. It should also be understood that, in some embodiments, the machine learning module 504 can be outside of or separate from the tree generating module 502. The machine learning module 502 can be configured to apply at least one machine learning technique or algorithm to a given set of data. For example, the machine learning module 502 can apply a machine learning technique, including an information gain technique, to historical data acquired from a data store(s) and formatted by a data formatting module (e.g., the data formatting module 302 in FIG. 3). In some instances, the machine learning technique can require given data to be in a particular format for compatibility (e.g., readability, operability, etc.) reasons. As discussed previously, the data formatting module (e.g., the data formatting module 302 in FIG. 3) can format the data appropriately.

In some implementations, the one or more machine learning techniques can be selected from a machine learning library. In one example, the one or more machine learning techniques can include a decision tree classifier technique. Various other machine learning techniques can be implemented consistent with various embodiments of the present disclosure. For example, the one or more machine learning techniques can include at least one of a classification technique, a clustering technique, a decision tree learning technique, a random forest technique, a logistic regression technique, a linear regression technique, a gradient boosting technique, other similar techniques, and/or any combination thereof.

The machine learning module 504 can apply the one or more machine learning techniques to the acquired (and formatted) historical data. In some embodiments, the one or more machine learning techniques can be applied in order to gain information about the historical data. The historical data can include a plurality of features associated with known legitimate activities and known illegitimate activities. In some cases, the machine learning techniques can be applied in order to gain information about the plurality of features associated with the known activities. With regard to identifying illegitimate activities, the information gained from analyzing the plurality of features associated with the known activities can be used to assist in identifying unknown (e.g., unclassified, unverified, future, etc.) activities as being illegitimate (or not). (It is contemplated that, in some implementations, other machine learning techniques, which do not necessarily correspond to entropy-based information gain algorithms, can also be utilized. Other classes and/or modules can be utilized as well.)

With regard to utilizing information gain algorithms, in one example, the machine learning module 504 can determine or calculate a measurement of information gain for each known activity with respect to each of the plurality of features. Continuing with this example, the machine learning module 504 can identify the feature having the highest information gain. The machine learning module 504 can then select a feature value for the identified feature, such that the historical data is split into two data subsets, wherein one of the two data subsets incorporates known activities that have feature values, for the identified feature, that are less than the selected feature value, and wherein the other data subset incorporates known activities that have feature values greater than selected feature value. The selected feature value can be (determined/calculated and) chosen such that the largest possible amount (or proportion) of known legitimate activities are incorporated by one data subset and the largest possible amount (or proportion) of known illegitimate activities are incorporated by the other data subset.

Continuing with the example, the information gain process can be repeated for each of the two data subsets. Based on the information gained and the splitting of data, a decision tree can be generated by the tree generating module 502. For example, a next highest node (e.g., the root node for the initial case) in the decision tree can represent the identified feature having the highest information gain. The next highest node in the decision tree can have two branches leading to two child nodes. The first branch and/or first child node can represent one of the two data subsets that is split based on the selected feature value. The second branch and/or second child node can represent the other data subset. Accordingly, one of the branches/child nodes can be associated with feature values less than the selected feature value while the other branch/child node can be associated with feature values greater than the selected feature value. The information gain process can be repeated to facilitate generating grandchild nodes and so forth. More detailed discussions and examples are provided below with reference to FIG. 6A, FIG. 6B, and FIG. 6C.

Still referring to FIG. 5, in some embodiments, the tree generating module 502 can optionally comprise a representation module 506. The representation module 506 can be configured to create a representation of the tree generated using information gain. For example, the representation module 506 can generate a visual representation of the tree. In some cases, the visual representation (e.g., textual representation, graphical representation, etc.) can be useful for reviewing the tree, analyzing data associated with the tree, and acquiring other information. In some embodiments, the tree generating module 502 can perform the functions of the representation module 506. In some cases, the tree generating module 502 can run or generate the tree and enable the tree to be explored, edited, and/or displayed, etc.

With reference now to FIG. 6A, example data 600 which can be utilized by the example tree generating module shown in FIG. 5 (e.g., the tree generating module 502) is illustrated, according to an embodiment of the present disclosure. The example data 600 can correspond to a portion of historical data which is acquired from a data store(s) and can be formatted by a data formatting module (e.g., the data formatting module 302 in FIG. 3). The example (historical) data 600 can include a plurality of features associated with known legitimate activities and with known illegitimate activities. As shown in the example of FIG. 6A, the plurality of features can include FEATURE X and FEATURE Y, and the known activities can include Activity 01 to Activity 16.

Each of the example activities in FIG. 6A can have a feature value for FEATURE X and a feature value for FEATURE Y, respectively. Again, as discussed above, the features to be included in the acquired historical data can be predetermined (e.g., preset, preconfigured, etc.) and the feature values for the features can be calculated for each activity when the activity occurs. Furthermore, each activity in FIG. 6A can be known to be legitimate or illegitimate. For example, as shown, an activity can be considered a known legitimate activity when the ILLEGITIMACY variable or label for the activity corresponds to a 0 (or false). In contrast, the activity can be considered a known illegitimate activity when the ILLEGITIMACY variable for the activity corresponds to a 1 (or true).

In some embodiments, the example data 600 can be utilized in one or more machine learning techniques (e.g., applied by the machine learning module 504 or the tree generating module 502 in FIG. 5) to derive or gain information about the plurality of features (and/or about the known activities).

Figure 6B:
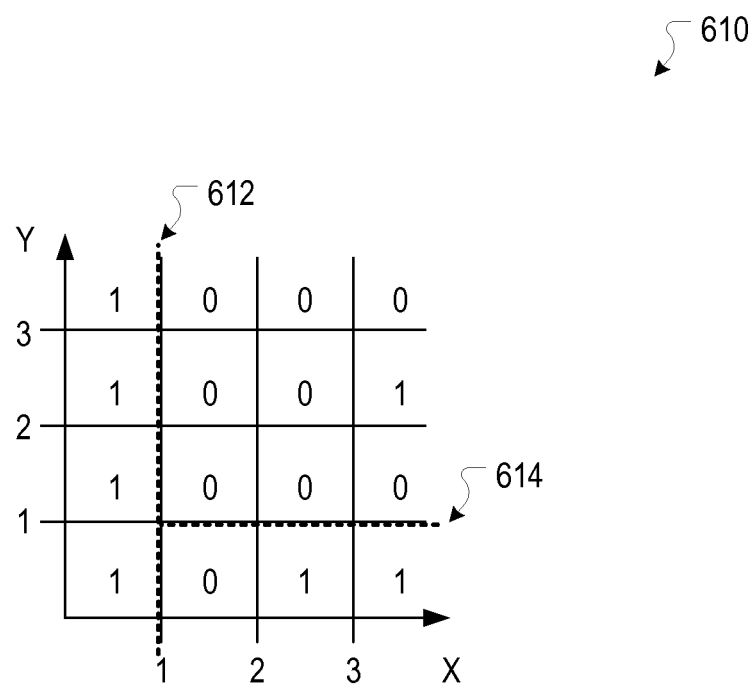
FIG. 6B illustrates an example data representation that can be utilized by the example tree generating module shown in FIG. 5, according to an embodiment of the present disclosure.

FIG. 6B illustrates an example data representation 610 that can be utilized by the example tree generating module shown in FIG. 5 (e.g., the tree generating module 502), according to an embodiment of the present disclosure. In some embodiments, the example data representation 610 can be created and/or utilized during the application of one or more machine learning techniques to the example data 600 of FIG. 6A.

As shown in the example of FIG. 6B, the data representation 610 can correspond to a graph in which each axis represents a feature included in the acquired data 600. Accordingly, in this example, the horizontal axis can represent FEATURE X and the vertical axis can represent FEATURE Y. It follows that the values for the horizontal axis can represent the feature values for FEATURE X, and the values for the vertical axis can represent the feature values for FEATURE Y. In addition, since the number of features can vary, it should be understood that the number of axes (and/or dimensions) in the graph can vary accordingly. For example, if there is a third feature in the acquired data 600, the third feature can be represented by a third axis (e.g., depth axis) in the example graph representation 610. Similarly, if there is a four feature in the acquired data 600, the four feature can be represented by a four dimension, and so forth.

In the example of FIG. 6B, the example 1 and 0 values within the graph can correspond to the ILLEGITIMACY values for each activity. For example, as shown in FIG. 6A, Activity 01 has a FEATURE X value of 0.4, a FEATURE Y value of 0.7, and an ILLEGITIMACY value of 1 (i.e., Activity 01 is known to be illegitimate). It follows that a value of 1 is shown in the lower left corner area of the graph 610, where FEATURE X is less than 1 and FEATURE Y is less than 1. Similarly, for example, Activity 02 has a FEATURE X value of 3.5, a FEATURE Y value of 3.1, and an ILLEGITIMACY value of 0. Thus, a value of 0 is shown in the upper right corner area of the graph 610, where FEATURE X is greater than 3 and FEATURE Y is greater than 3. The other activities can likewise be represented in the graph 610.

One or more machine learning techniques (e.g., applied by the machine learning module 504 or the tree generating module 502 in FIG. 5) can utilize information gain with respect to the example data representation 610. For example, one or more machine learning techniques can correspond to information gain, in the case of a decision tree. (Other machine learning techniques can be utilized as well.) Machine learning can be utilized to determine at which feature to split the data. Moreover, machine learning can be utilized to determine at what feature value, of the determined feature, to split the data. In the example of FIG. 6B, information gain values can be determined or calculated for each of the features (e.g., FEATURE X and FEATURE Y). In some implementations, information gain can be calculated based on entropy, which can characterize the predictability (or unpredictability) of a set of data. Information gain can refer to an expected decrease in entropy due to splitting the set of data with respect to a particular feature. For example, information gain can be determined as a difference between a entropy value before splitting the data at the particular feature and an entropy value after splitting the data at the particular feature. There can be various conventional approaches to determining or calculating information gain. As such, the process of determining or calculating information gain is not discussed in detail herein.

Continuing with the example of FIG. 6B, the information gain for FEATURE X can be determined to be greater than the information gain for FEATURE Y. In this regard, splitting the data with respect to FEATURE X can gain more information than splitting the data with respect to FEATURE Y. As such, the next split (in this example, the first split) can be made with respect to FEATURE X, since the information gain value for FEATURE X is greater than the information gain value for FEATURE Y.

Moreover, machine learning can indicate that the data should be split at feature value 1 for FEATURE X. For example, machine learning can determine that splitting the data with respect to feature value 1 for FEATURE X (e.g., FEATURE X=1) can result in the largest amount of known illegitimate activities on one side of the split (e.g., in a first subset of the data 600) and the largest amount of known legitimate activities on another side of the split (e.g., in a second subset of the data 600). For example, splitting the data at FEATURE X=1 (e.g., split 612) can result in four illegitimate activities (out of four activities) being in one (e.g., the left one, the first data subset, etc.) of the two data subsets, and nine legitimate activities (out of twelve activities) being in the other data subset (e.g., the right one, the second data subset, etc.). Accordingly, the percentage of illegitimate activities in the one data subset is 100% (i.e., four illegitimate activities out of four total activities in the one subset). The percentage of illegitimate activities in the other data subset is 25% (i.e., three illegitimate activities out of twelve total activities in the other subset), or the percentage of legitimate activities is 75%.

Machine learning can determine how to make the next split. In this example, the second split can be made with respect to FEATURE Y and at a feature value of 1. This next split (e.g., split 614) results in two additional data subsets, in which the largest possible amount of known illegitimate activities is associated with (e.g., represented by) one of the subsets (e.g., the top subset), and the largest possible amount of known legitimate activities is associated with the other subset (e.g., the bottom subset). Upon making this split (e.g., split 614), the percentage of illegitimate activities in the top subset is approximately 11.11% (i.e., one known illegitimate activity out of nine total activities in the top subset), or the percentage of legitimate activities is approximately 88.89%. The percentage of illegitimate activities in the bottom subset is approximately 66.67% (i.e., two known illegitimate activities out of three total activities in the bottom subset). The machine learning technique or process can repeat to determine the next split, and so forth. Based on at least a portion of the information about the features (e.g., at which feature to perform the next split, at what feature value to make the next split, etc.), a decision tree for identifying illegitimate activities can be generated.

It should also be noted that the example graph representation 610 of FIG. 6B is provided for illustrative purposes. It should be understood that various other representations can be used. It is further contemplated that, in some embodiments, the one or more machine learning techniques need not create and/or utilize data representation.

Figure 6C:
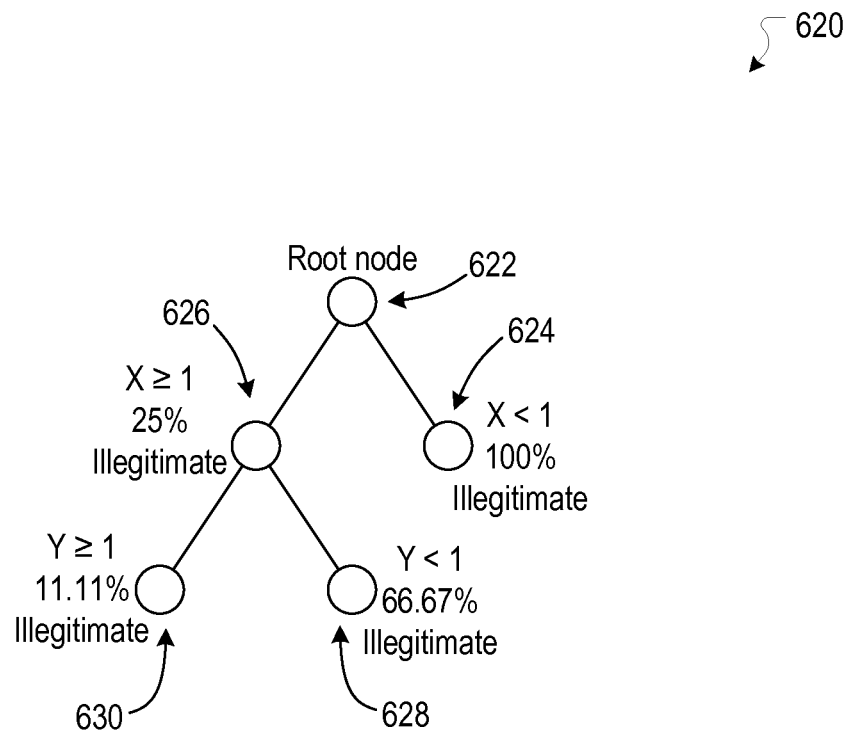
FIG. 6C illustrates an example decision tree that can be provided by the example tree generating module shown in FIG. 5, according to an embodiment of the present disclosure.

FIG. 6C illustrates an example decision tree 620 that can be provided by the example tree generating module shown in FIG. 5 (e.g., the tree generating module 502), according to an embodiment of the present disclosure. As shown in the example of FIG. 6C, the decision tree 620 can comprise a root node 622, a first child node 624 (of the root node 622), a second child node 626 (of the root node 622), a first grandchild node 628 (of the root node 622), and a second grandchild node 630 (of the root node 622). In this example, the root node 622 can be generated based on or in association with the feature at which data (e.g., acquired historical data 600 in FIG. 6A) is initially split into two subsets.

Continuing with the example discussed above, the root node 622 can be associated with or can correspond to FEATURE X. Since the first split (e.g., split 612 in FIG. 6B) is made with respect to FEATURE X=1, then one of the root node's children (e.g., the first child node 624) can represent the first data subset, whose activities are associated with FEATURE X values that are less than 1 (or, alternatively, less than or equal to 1). The percentage of known illegitimate activities to total activities in the first data subset can be 100%. The second data subset, resulting from the split with respect to FEATURE X=1, can be represented by the second child node 626. Node 626 can represent the activities in the second data subset whose FEATURE X values are greater than or equal to 1 (or, alternatively, greater than 1). The percentage of known illegitimate activities to total activities in the second data subset can be 25% (or the percentage of known legitimate activities is 75%).

Furthermore, as discussed in the above example, there can be a second split (e.g., split 614 in FIG. 6B) at FEATURE Y=1. It follows that node 626 can be associated with the second split 614 and can have two children nodes (e.g., two grandchildren nodes of the root node 622). The first child node 628 of node 626 can represent the data subset associated with FEATURE Y values that are less than 1 (or, alternatively, less than or equal to 1). Also, node 628 can be associated with a percentage, of known illegitimate activities to total activities in the data subset, of approximately 66.67%, The second child node 630 of node 626 can represent the data subset associated with FEATURE Y values that are greater than or equal to 1 (or, alternatively, greater than 1). Node 630 can be associated with a percentage, of known illegitimate activities to total activities in the data subset, of approximately 11.11% (or Node 630 can be associated with a percentage of known legitimate activities equal to approximately 88.89%. If the machine learning continues to split data, additional child nodes can be added to the decision tree 620. Based on at least a portion of (information about) the decision tree 620, one or more rules for identifying illegitimate activities can be generated (e.g., developed, written, created, etc.).

Figure 7:
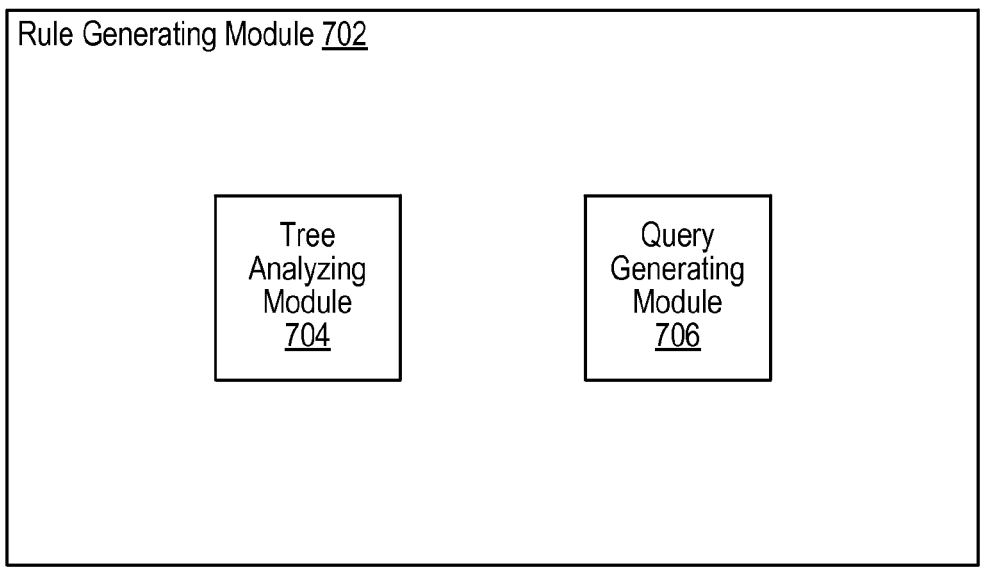
FIG. 7 illustrates an example rule generating module shown in FIG. 1, according to an embodiment of the present disclosure.

FIG. 7 illustrates an example rule generating module 702 shown in FIG. 1 (e.g., the rule generating module 110), according to an embodiment of the present disclosure. The example rule generating module 702 can be configured to generate one or more rules for identifying illegitimate activities. The one or more rules can be generated by the rule generating module 110 in various formats and/or languages (e.g., SQL, FXL, etc.).

In some embodiments, the rule generating module 702 can comprise a tree analyzing module 704. The tree analyzing module 702 can be configured to analyze, for example, a decision tree produced by a tree generating module (e.g., the tree generating module 502 in FIG. 5).

In one example, the tree analyzing module 702 can receive a decision tree (e.g., 620 in FIG. 6C). The tree analyzing module 702 can determine whether at least one node is associated with a percentage, of known illegitimate activities in a data subset represented by the node relative to total activities in the data subset, that at least meets a threshold metric indicated by specified precision criteria. If, for example, the precision criteria specifies a 90% threshold metric, then the tree analyzing module 702 can determine that node 624 in FIG. 6C meets the 90% threshold metric, because node 624 has a precision metric of 100% (node 624 represents a data subset having four known illegitimate activities out of four known activities). In another example, if the precision criteria is specified to require a 60% threshold metric, then the tree analyzing module 702 can determine that node 624 and node 628 in FIG. 6C both satisfy the specified precision threshold.

The tree analyzing module can select the node(s) that satisfy the specified precision threshold and can generate a rule based on the selected node(s). If, for example, node 624 is selected, then the rule can set the condition that "FEATURE X value must be less than 1" or "X<1." In other words, the rule can set forth that if an activity has a FEATURE X value that is less than 1, then the activity can be considered illegitimate. If, for example, node 628 is selected, then the rule can state the condition that "FEATURE X value must be greater than or equal to 1 and FEATURE Y value must be less than 1" or "X≥1 and Y<1." In other words, the rule sets forth that if an activity has a FEATURE X value that is greater than or equal to 1 and a FEATURE Y value that is less than 1, then the activity is illegitimate. Accordingly, the one or more rules generated based on the tree (or based on at least a portion of the information about the features represented in the tree) can identify illegitimate activities. In some embodiments, rules may be based on all of the features for which values are reflected in a tree. In some embodiments, rules may be based on a portion of the features for which values are reflected in a tree. The number of features on which a rule is based reflects required accuracy in the determination of illegitimate activities (or legitimate activities) in various applications.

In some embodiments, rules for identifying illegitimate activities can be written as queries. Accordingly, in some implementations, the rule generating module 702 can comprise a query generating module 706. The query generating module 706 can be configured to generate rules in the form of queries. In one example, queries can be written in Structured Query Language (SQL). However, various other suitable languages or formats (e.g., FXL) can be utilized to generate the queries for identifying illegitimate activities.

In some embodiments, the tree analyzing module 704 can be part of or integrated with the tree generating module (e.g., module 502 in FIG. 5). In some cases, the backtesting module (e.g., module 102 in FIG. 1) can facilitate interaction between the tree generating module (capable of acquiring information about a tree in a general format) and the rule generating module (e.g., module 110 in FIG. 1). For example, if a user wants to write or create a rule, the user can select an option to do so. In response, the backtesting module can request the tree generating module for the relevant data and can pass the data to the rule generating module, which can use that data to generate the rule (e.g., in SQL, in FXL, etc.) and, in some cases, one or more performance metrics.

Figure 8:
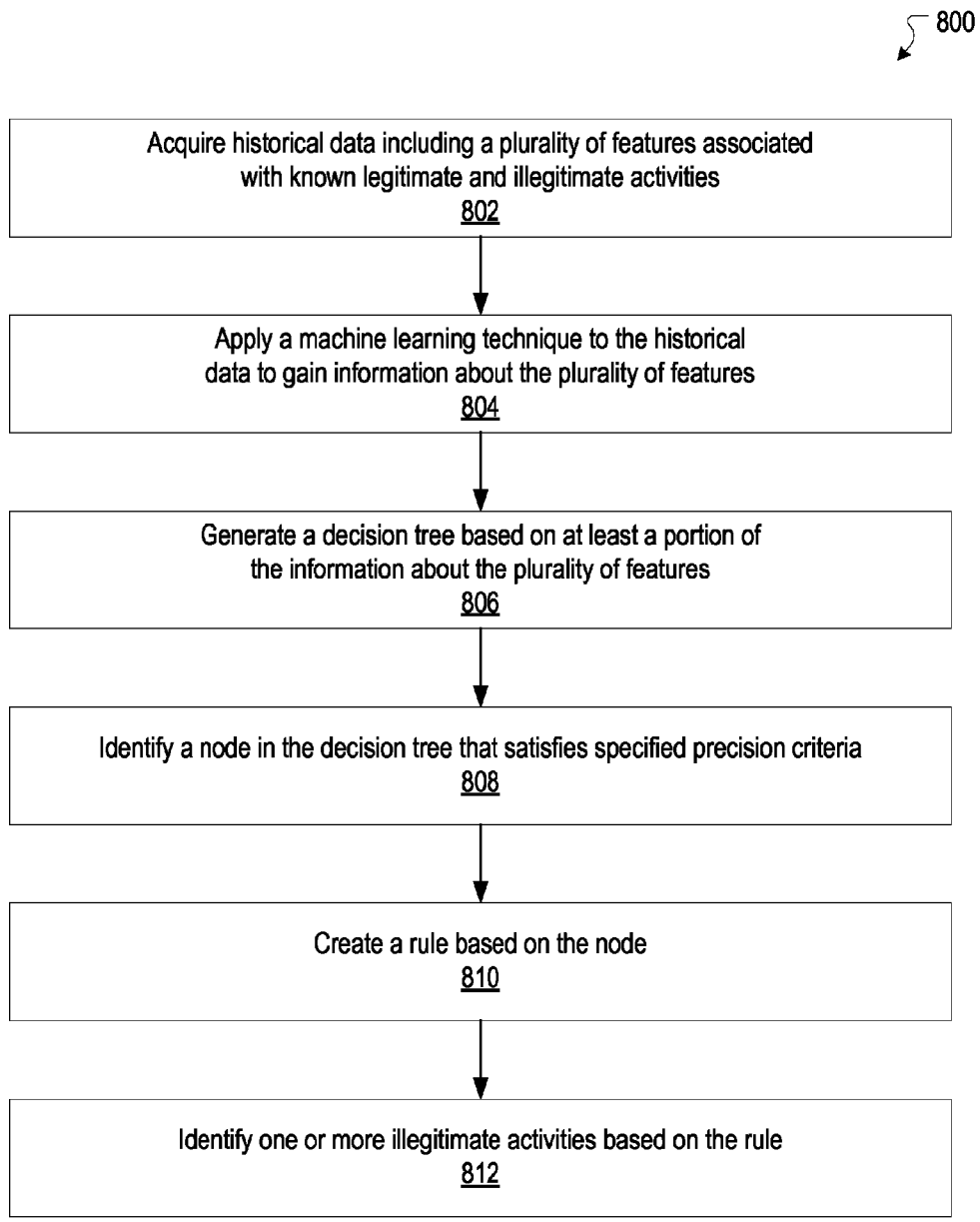
FIG. 8 illustrates an example method for identifying illegitimate activities based on historical data, according to an embodiment of the present disclosure.

FIG. 8 illustrates an example method for identifying illegitimate activities based on historical data, according to an embodiment of the present disclosure. Again, it should be appreciated that there can be additional, fewer, or alternative steps performed in similar or alternative orders, or in parallel, within the scope of the various embodiments unless otherwise stated.

At step 802, the example method 800 can acquire historical data. The historical data can include a plurality of features associated with known legitimate activities and with known illegitimate activities. In some embodiments, the historical data can be acquired from one or more data stores. In some embodiments, the plurality of features can be preset or pre-specified. Also, in some cases, the historical data can be selected based on one or more input parameters.

Step 804 can include applying a machine learning technique(s) to the historical data. The machine learning technique can be applied in order to gain information about the plurality of features associated with the known legitimate activities and with the known illegitimate activities. For example, applying the machine learning technique(s) can include applying an information gain process(es) to determine at which feature(s) and what associated feature value(s) to split the acquired historical data into sets (e.g., subsets, subsets of subsets, subsets of subsets of subsets, etc.).

The example method 800 can generate a decision tree based on at least a portion of the information about the plurality of features, at step 806. For example, information gain can be used to determine at which features and what associated feature values to split the acquired historical data. Nodes (e.g., parents, children, grandchildren, and so forth) and branches of the decision tree can be formed to represent the features and features values at which the historical data is split into subsets, subsets of subsets, and so forth.

Step 808 can include identifying a node in the decision tree that satisfies specified precision criteria. For example, specified precision criteria can indicate a threshold metric of 90% precision. As such, the method 800 can identify a node(s) associated with at least 90% precision (e.g., a percentage of illegitimate activities to total activities in the data subset(s) represented by the node(s)). Then, at step 810, a rule for identifying illegitimate activities can be created based on the node. For example, the rule can be created based on a path leading to a node that satisfies the specified precision criteria. The rule can incorporate the properties or information related to each node and/or branch in the path. Then the method 800 can identify one or more illegitimate activities based on the rule, at step 812. In some cases, newly identified illegitimate activities (and/or legitimate activities) can be incorporated into the historical data, such that the historical data can grow and change over time. In some embodiments, the one or more identified illegitimate activities can be blocked or otherwise prevented. For example, when the rule has been implemented, the one or more identified illegitimate activities can be stopped in real-time (or near real-time).

It is further contemplated that there can be many other uses, applications, and/or variations associated with the various embodiments of the present disclosure.

Social Networking System—Example Implementation

Figure 9:
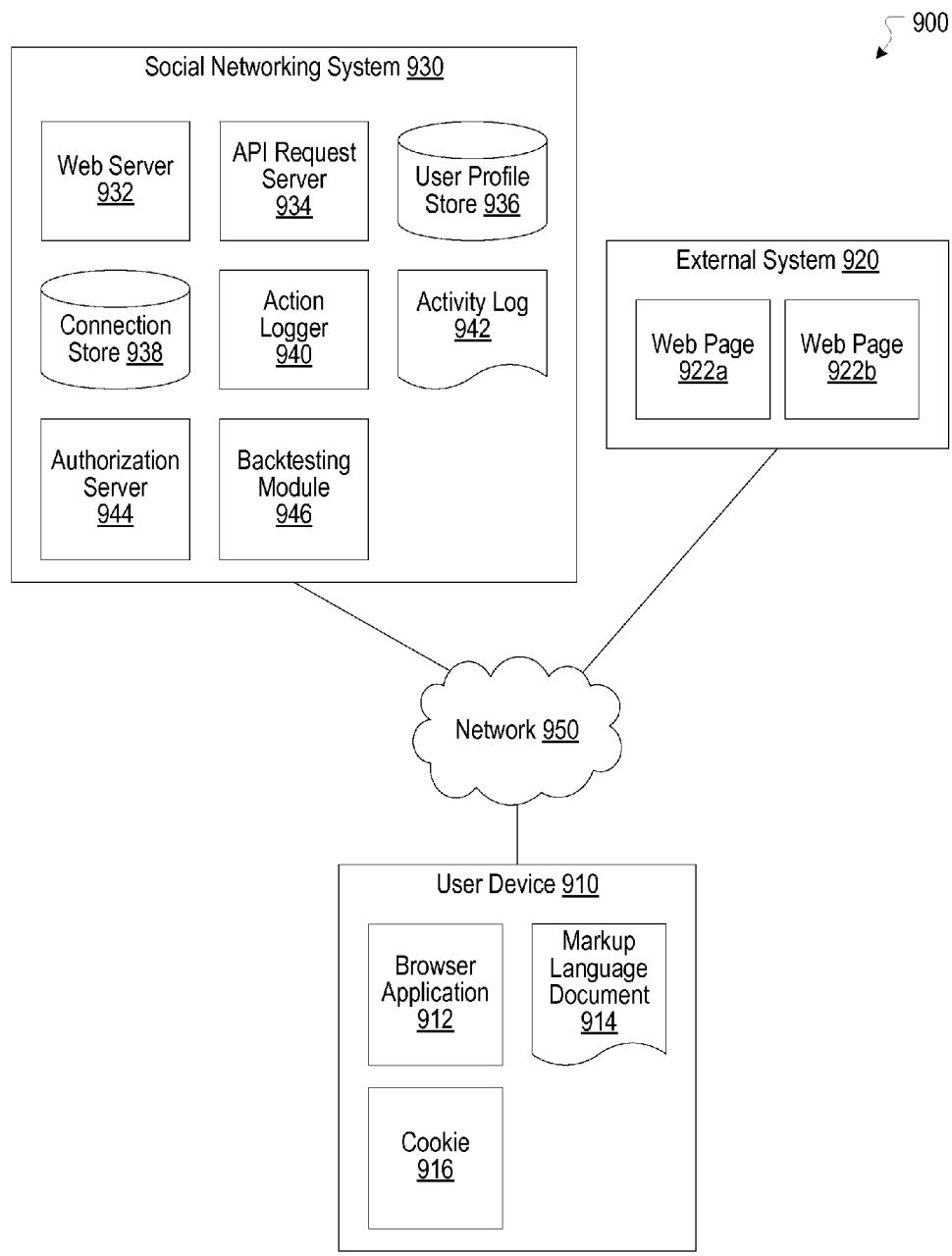
FIG. 9 illustrates a network diagram of an example system that can be utilized in various scenarios, according to an embodiment of the present disclosure.

FIG. 9 illustrates a network diagram of an example system 900 that can be utilized in various embodiments for enhanced video encoding, in accordance with an embodiment of the present disclosure. The system 900 includes one or more user devices 910, one or more external systems 920, a social networking system 930, and a network 950. In an embodiment, the social networking service, provider, and/or system discussed in connection with the embodiments described above may be implemented as the social networking system 930. For purposes of illustration, the embodiment of the system 900, shown by FIG. 9, includes a single external system 920 and a single user device 910. However, in other embodiments, the system 900 may include more user devices 910 and/or more external systems 920. In certain embodiments, the social networking system 930 is operated by a social network provider, whereas the external systems 920 are separate from the social networking system 930 in that they may be operated by different entities. In various embodiments, however, the social networking system 930 and the external systems 920 operate in conjunction to provide social networking services to users (or members) of the social networking system 930. In this sense, the social networking system 930 provides a platform or backbone, which other systems, such as external systems 920, may use to provide social networking services and functionalities to users across the Internet.

The user device 910 comprises one or more computing devices that can receive input from a user and transmit and receive data via the network 950. In one embodiment, the user device 910 is a conventional computer system executing, for example, a Microsoft Windows compatible operating system (OS), Apple OS X, and/or a Linux distribution. In another embodiment, the user device 910 can be a device having computer functionality, such as a smart-phone, a tablet, a personal digital assistant (PDA), a mobile telephone, etc. The user device 910 is configured to communicate via the network 950. The user device 910 can execute an application, for example, a browser application that allows a user of the user device 910 to interact with the social networking system 930. In another embodiment, the user device 910 interacts with the social networking system 930 through an application programming interface (API) provided by the native operating system of the user device 910, such as iOS and ANDROID. The user device 910 is configured to communicate with the external system 920 and the social networking system 930 via the network 950, which may comprise any combination of local area and/or wide area networks, using wired and/or wireless communication systems.

In one embodiment, the network 950 uses standard communications technologies and protocols. Thus, the network 950 can include links using technologies such as Ethernet, 702.11, worldwide interoperability for microwave access (WiMAX), 3G, 4G, CDMA, GSM, LTE, digital subscriber line (DSL), etc. Similarly, the networking protocols used on the network 950 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 950 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 910 may display content from the external system 920 and/or from the social networking system 930 by processing a markup language document 914 received from the external system 920 and from the social networking system 930 using a browser application 912. The markup language document 914 identifies content and one or more instructions describing formatting or presentation of the content. By executing the instructions included in the markup language document 914, the browser application 912 displays the identified content using the format or presentation described by the markup language document 914. For example, the markup language document 914 includes instructions for generating and displaying a web page having multiple frames that include text and/or image data retrieved from the external system 920 and the social networking system 930. In various embodiments, the markup language document 914 comprises a data file including extensible markup language (XML) data, extensible hypertext markup language (XHTML) data, or other markup language data. Additionally, the markup language document 914 may include JavaScript Object Notation (JSON) data, JSON with padding (JSONP), and JavaScript data to facilitate data-interchange between the external system 920 and the user device 910. The browser application 912 on the user device 910 may use a JavaScript compiler to decode the markup language document 914.

The markup language document 914 may also include, or link to, applications or application frameworks such as FLASH™ or Unity™ applications, the SilverLight™ application framework, etc.

In one embodiment, the user device 910 also includes one or more cookies 916 including data indicating whether a user of the user device 910 is logged into the social networking system 930, which may enable modification of the data communicated from the social networking system 930 to the user device 910.

The external system 920 includes one or more web servers that include one or more web pages 922a, 922b, which are communicated to the user device 910 using the network 950. The external system 920 is separate from the social networking system 930. For example, the external system 920 is associated with a first domain, while the social networking system 930 is associated with a separate social networking domain. Web pages 922a, 922b, included in the external system 920, comprise markup language documents 914 identifying content and including instructions specifying formatting or presentation of the identified content.

The social networking system 930 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 930 may be administered, managed, or controlled by an operator. The operator of the social networking system 930 may be a human being, an automated application, or a series of applications for managing content, regulating policies, and collecting usage metrics within the social networking system 930. Any type of operator may be used.

Users may join the social networking system 930 and then add connections to any number of other users of the social networking system 930 to whom they desire to be connected. As used herein, the term "friend" refers to any other user of the social networking system 930 to whom a user has formed a connection, association, or relationship via the social networking system 930. For example, in an embodiment, if users in the social networking system 930 are represented as nodes in the social graph, the term "friend" can refer to an edge formed between and directly connecting two user nodes.

Connections may be added explicitly by a user or may be automatically created by the social networking system 930 based on common characteristics of the users (e.g., users who are alumni of the same educational institution). For example, a first user specifically selects a particular other user to be a friend. Connections in the social networking system 930 are usually in both directions, but need not be, so the terms "user" and "friend" depend on the frame of reference. Connections between users of the social networking system 930 are usually bilateral ("two-way"), or "mutual," but connections may also be unilateral, or "one-way." For example, if Bob and Joe are both users of the social networking system 930 and connected to each other, Bob and Joe are each other's connections. If, on the other hand, Bob wishes to connect to Joe to view data communicated to the social networking system 930 by Joe, but Joe does not wish to form a mutual connection, a unilateral connection may be established. The connection between users may be a direct connection; however, some embodiments of the social networking system 930 allow the connection to be indirect via one or more levels of connections or degrees of separation.

In addition to establishing and maintaining connections between users and allowing interactions between users, the social networking system 930 provides users with the ability to take actions on various types of items supported by the social networking system 930. These items may include groups or networks (i.e., social networks of people, entities, and concepts) to which users of the social networking system 930 may belong, events or calendar entries in which a user might be interested, computer-based applications that a user may use via the social networking system 930, transactions that allow users to buy or sell items via services provided by or through the social networking system 930, and interactions with advertisements that a user may perform on or off the social networking system 930. These are just a few examples of the items upon which a user may act on the social networking system 930, and many others are possible. A user may interact with anything that is capable of being represented in the social networking system 930 or in the external system 920, separate from the social networking system 930, or coupled to the social networking system 930 via the network 950.

The social networking system 930 is also capable of linking a variety of entities. For example, the social networking system 930 enables users to interact with each other as well as external systems 920 or other entities through an API, a web service, or other communication channels. The social networking system 930 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 930. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 930 modifies edges connecting the various nodes to reflect the relationships and interactions.

The social networking system 930 also includes user-generated content, which enhances a user's interactions with the social networking system 930. User-generated content may include anything a user can add, upload, send, or "post" to the social networking system 930. For example, a user communicates posts to the social networking system 930 from a user device 910. Posts may include data such as status updates or other textual data, location information, images such as photos, videos, links, music or other similar data and/or media. Content may also be added to the social networking system 930 by a third party. Content "items" are represented as objects in the social networking system 930. In this way, users of the social networking system 930 are encouraged to communicate with each other by posting text and content items of various types of media through various communication channels. Such communication increases the interaction of users with each other and increases the frequency with which users interact with the social networking system 930.

The social networking system 930 includes a web server 932, an API request server 934, a user profile store 936, a connection store 938, an action logger 940, an activity log 942, and an authorization server 944. In an embodiment of the invention, the social networking system 930 may include additional, fewer, or different components for various applications. Other components, such as network interfaces, security mechanisms, load balancers, failover servers, management and network operations consoles, and the like are not shown so as to not obscure the details of the system.

The user profile store 936 maintains information about user accounts, including biographic, demographic, and other types of descriptive information, such as work experience, educational history, hobbies or preferences, location, and the like that has been declared by users or inferred by the social networking system 930. This information is stored in the user profile store 936 such that each user is uniquely identified. The social networking system 930 also stores data describing one or more connections between different users in the connection store 938. The connection information may indicate users who have similar or common work experience, group memberships, hobbies, or educational history. Additionally, the social networking system 930 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 930, such as non-person entities, buckets, cluster centers, images, interests, pages, external systems, concepts, and the like are also stored in the connection store 938.

The social networking system 930 maintains data about objects with which a user may interact. To maintain this data, the user profile store 936 and the connection store 938 store instances of the corresponding type of objects maintained by the social networking system 930. Each object type has information fields that are suitable for storing information appropriate to the type of object. For example, the user profile store 936 contains data structures with fields suitable for describing a user's account and information related to a user's account. When a new object of a particular type is created, the social networking system 930 initializes a new data structure of the corresponding type, assigns a unique object identifier to it, and begins to add data to the object as needed. This might occur, for example, when a user becomes a user of the social networking system 930, the social networking system 930 generates a new instance of a user profile in the user profile store 936, assigns a unique identifier to the user account, and begins to populate the fields of the user account with information provided by the user.

The connection store 938 includes data structures suitable for describing a user's connections to other users, connections to external systems 920 or connections to other entities. The connection store 938 may also associate a connection type with a user's connections, which may be used in conjunction with the user's privacy setting to regulate access to information about the user. In an embodiment of the invention, the user profile store 936 and the connection store 938 may be implemented as a federated database.

Data stored in the connection store 938, the user profile store 936, and the activity log 942 enables the social networking system 930 to generate the social graph that uses nodes to identify various objects and edges connecting nodes to identify relationships between different objects. For example, if a first user establishes a connection with a second user in the social networking system 930, user accounts of the first user and the second user from the user profile store 936 may act as nodes in the social graph. The connection between the first user and the second user stored by the connection store 938 is an edge between the nodes associated with the first user and the second user. Continuing this example, the second user may then send the first user a message within the social networking system 930. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 930 (or, alternatively, in an image maintained by another system outside of the social networking system 930). The image may itself be represented as a node in the social networking system 930. This tagging action may create edges between the first user and the second user as well as create an edge between each of the users and the image, which is also a node in the social graph. In yet another example, if a user confirms attending an event, the user and the event are nodes obtained from the user profile store 936, where the attendance of the event is an edge between the nodes that may be retrieved from the activity log 942. By generating and maintaining the social graph, the social networking system 930 includes data describing many different types of objects and the interactions and connections among those objects, providing a rich source of socially relevant information.

The web server 932 links the social networking system 930 to one or more user devices 910 and/or one or more external systems 920 via the network 950. The web server 932 serves web pages, as well as other web-related content, such as Java, JavaScript, Flash, XML, and so forth. The web server 932 may include a mail server or other messaging functionality for receiving and routing messages between the social networking system 930 and one or more user devices 910. The messages can be instant messages, queued messages (e.g., email), text and SMS messages, or any other suitable messaging format.

The API request server 934 allows one or more external systems 920 and user devices 910 to call access information from the social networking system 930 by calling one or more API functions. The API request server 934 may also allow external systems 920 to send information to the social networking system 930 by calling APIs. The external system 920, in one embodiment, sends an API request to the social networking system 930 via the network 950, and the API request server 934 receives the API request. The API request server 934 processes the request by calling an API associated with the API request to generate an appropriate response, which the API request server 934 communicates to the external system 920 via the network 950. For example, responsive to an API request, the API request server 934 collects data associated with a user, such as the user's connections that have logged into the external system 920, and communicates the collected data to the external system 920. In another embodiment, the user device 910 communicates with the social networking system 930 via APIs in the same manner as external systems 920.

The action logger 940 is capable of receiving communications from the web server 932 about user actions on and/or off the social networking system 930. The action logger 940 populates the activity log 942 with information about user actions, enabling the social networking system 930 to discover various actions taken by its users within the social networking system 930 and outside of the social networking system 930. Any action that a particular user takes with respect to another node on the social networking system 930 may be associated with each user's account, through information maintained in the activity log 942 or in a similar database or other data repository. Examples of actions taken by a user within the social networking system 930 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 930, the action is recorded in the activity log 942. In one embodiment, the social networking system 930 maintains the activity log 942 as a database of entries. When an action is taken within the social networking system 930, an entry for the action is added to the activity log 942. The activity log 942 may be referred to as an action log.

Additionally, user actions may be associated with concepts and actions that occur within an entity outside of the social networking system 930, such as an external system 920 that is separate from the social networking system 930. For example, the action logger 940 may receive data describing a user's interaction with an external system 920 from the web server 932. In this example, the external system 920 reports a user's interaction according to structured actions and objects in the social graph.

Other examples of actions where a user interacts with an external system 920 include a user expressing an interest in an external system 920 or another entity, a user posting a comment to the social networking system 930 that discusses an external system 920 or a web page 922a within the external system 920, a user posting to the social networking system 930 a Uniform Resource Locator (URL) or other identifier associated with an external system 920, a user attending an event associated with an external system 920, or any other action by a user that is related to an external system 920. Thus, the activity log 942 may include actions describing interactions between a user of the social networking system 930 and an external system 920 that is separate from the social networking system 930.

The authorization server 944 enforces one or more privacy settings of the users of the social networking system 930. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 920, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 920. One embodiment allows the specification of the set of entities to comprise an enumeration of entities. For example, the user may provide a list of external systems 920 that are allowed to access certain information. Another embodiment allows the specification to comprise a set of entities along with exceptions that are not allowed to access the information. For example, a user may allow all external systems 920 to access the user's work information, but specify a list of external systems 920 that are not allowed to access the work information. Certain embodiments call the list of exceptions that are not allowed to access certain information a "block list". External systems 920 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 944 contains logic to determine if certain information associated with a user can be accessed by a user's friends, external systems 920, and/or other applications and entities. The external system 920 may need authorization from the authorization server 944 to access the user's more private and sensitive information, such as the user's work phone number. Based on the user's privacy settings, the authorization server 944 determines if another user, the external system 920, an application, or another entity is allowed to access information associated with the user, including information about actions taken by the user.

The social networking system 930 can include a backtesting module 946. In some embodiments, the backtesting module 946 can be implemented as the backtesting module 102 of FIG. 1. The backtesting module 946 can be configured to facilitate identifying illegitimate activities based on historical data. For example, historical data associated with activities that are known to be legitimate and illegitimate can be stored with the social networking system 930. The backtesting module 946 can analyze the historical data to generate one or more rules for identifying (future) activities that are not yet identified, classified, verified, etc. When the user device 910 engages in an activity, such as a transaction involving financial information, the backtesting module 946 can utilize the rules to determine whether or not the activity is legitimate. If the activity is illegitimate, the backtesting module 946 can block the illegitimate activity (e.g., fraudulent financial transaction), provide an alert reporting the illegitimate activity, and/or perform other suitable actions.

In some embodiments, the social networking system 930 can comprise one or more actioning Sigma servers (not illustrated in FIG. 9), which can comprise the backtesting module 946. For example, the backtesting module 946 can plug into the one or more actioning Sigma servers. In some embodiments, this can be facilitated and/or performed by manual effort (e.g., manual review by a user such as an analyst). The backtesting module 946 can be configured to provide the actioning Sigma servers with instructions regarding what (e.g., identified illegitimate activities) to block. In some cases, the identifying and blocking of illegitimate activities can be initiated by a user, such as an analyst.

Hardware Implementation

Figure 10:
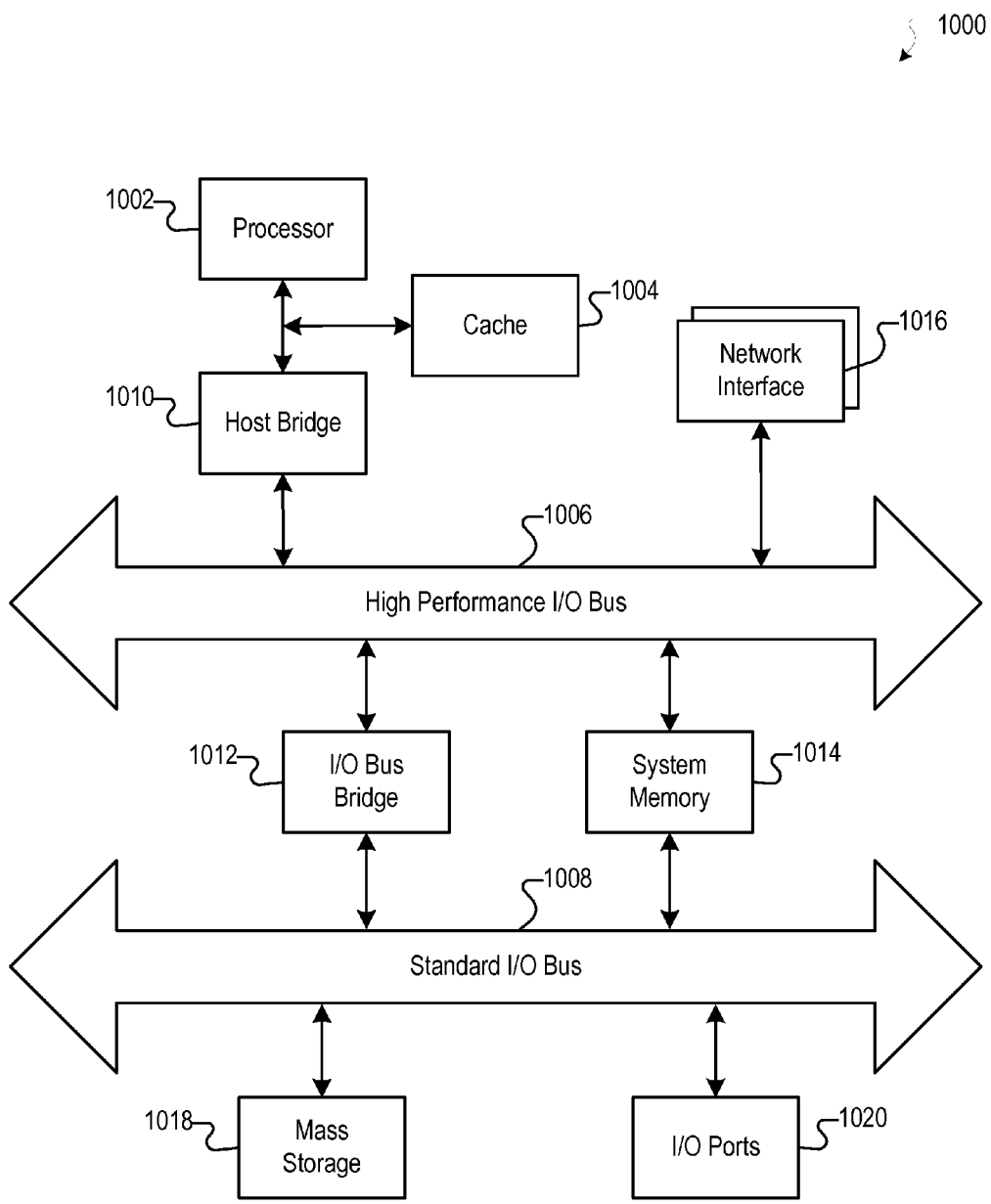
FIG. 10 illustrates an example of a computer system that can be utilized in various scenarios, according to an embodiment of the present disclosure.

The foregoing processes and features can be implemented by a wide variety of machine and computer system architectures and in a wide variety of network and computing environments. FIG. 10 illustrates an example of a computer system 1000 that may be used to implement one or more of the embodiments described herein in accordance with an embodiment of the invention. The computer system 1000 includes sets of instructions for causing the computer system 1000 to perform the processes and features discussed herein. The computer system 1000 may be connected (e.g., networked) to other machines. In a networked deployment, the computer system 1000 may operate in the capacity of a server machine or a client machine in a client-server network environment, or as a peer machine in a peer-to-peer (or distributed) network environment. In an embodiment of the invention, the computer system 1000 may be the social networking system 1030, the user device 910, and the external system 1020, or a component thereof. In an embodiment of the invention, the computer system 1000 may be one server among many that constitutes all or part of the social networking system 1030.

The computer system 1000 includes a processor 1002, a cache 1004, and one or more executable modules and drivers, stored on a computer-readable medium, directed to the processes and features described herein. Additionally, the computer system 1000 includes a high performance input/output (I/O) bus 1006 and a standard I/O bus 1008. A host bridge 1010 couples processor 1002 to high performance I/O bus 1006, whereas I/O bus bridge 1012 couples the two buses 1006 and 1008 to each other. A system memory 1014 and one or more network interfaces 1016 couple to high performance I/O bus 1006. The computer system 1000 may further include video memory and a display device coupled to the video memory (not shown). Mass storage 1018 and I/O ports 1020 couple to the standard I/O bus 1008. The computer system 1000 may optionally include a keyboard and pointing device, a display device, or other input/output devices (not shown) coupled to the standard I/O bus 1008. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 1000, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 1000 are described in greater detail below. In particular, the network interface 1016 provides communication between the computer system 1000 and any of a wide range of networks, such as an Ethernet (e.g., IEEE 802.3) network, a backplane, etc. The mass storage 1018 provides permanent storage for the data and programming instructions to perform the above-described processes and features implemented by the respective computing systems identified above, whereas the system memory 1014 (e.g., DRAM) provides temporary storage for the data and programming instructions when executed by the processor 1002. The I/O ports 1020 may be one or more serial and/or parallel communication ports that provide communication between additional peripheral devices, which may be coupled to the computer system 1000.

The computer system 1000 may include a variety of system architectures, and various components of the computer system 1000 may be rearranged. For example, the cache 1004 may be on-chip with processor 1002. Alternatively, the cache 1004 and the processor 1002 may be packed together as a "processor module", with processor 1002 being referred to as the "processor core". Furthermore, certain embodiments of the invention may neither require nor include all of the above components. For example, peripheral devices coupled to the standard I/O bus 1008 may couple to the high performance I/O bus 1006. In addition, in some embodiments, only a single bus may exist, with the components of the computer system 1000 being coupled to the single bus. Furthermore, the computer system 1000 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 1000 that, when read and executed by one or more processors, cause the computer system 1000 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 1000, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 1002. Initially, the series of instructions may be stored on a storage device, such as the mass storage 1018. However, the series of instructions can be stored on any suitable computer readable storage medium. Furthermore, the series of instructions need not be stored locally, and could be received from a remote storage device, such as a server on a network, via the network interface 1016. The instructions are copied from the storage device, such as the mass storage 1018, into the system memory 1014 and then accessed and executed by the processor 1002. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 1000 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed:

1. A computer-implemented method comprising:
   acquiring, by a computing system, historical data including a plurality of features associated with known legitimate activities and with known illegitimate activities, wherein at least some of the known legitimate activities and the known illegitimate activities include one or more financial transactions;
   applying, by the computing system, a machine learning technique to the historical data to gain information about the plurality of features associated with the known legitimate activities and with the known illegitimate activities;
   generating, by the computing system, a decision tree based on at least a portion of the information about the plurality of features;
   identifying, by the computing system, a node in the decision tree that satisfies specified precision criteria;
   creating, by the computing system, a rule based on the node identified in the decision tree, wherein the rule corresponds to a conditional rule which indicates that a particular activity is illegitimate when one or more features associated with the particular activity respectively meet one or more feature values specified by the rule; and
   identifying, by the computing system, one or more illegitimate activities based on the rule, wherein applying the machine learning technique to the acquired historical data to gain the information about the plurality of features further comprises:
   determining a respective information gain for each feature in the plurality of features;
   identifying a feature having a highest information gain; and
   selecting a feature value, for the feature, that partitions the historical data into a first data subset and a second data subset, wherein the feature value is selected such that a largest possible amount of known legitimate activities is in the first data subset and a largest possible amount of known illegitimate activities is in the second data subset.

2. The computer-implemented method of claim 1, wherein either: 1) the first data subset is associated with feature values less than the feature value that partitions the historical data and the second data subset is associated with feature values greater than the feature value that partitions the historical data, or 2) the first data subset is associated with feature values greater than the feature value that partitions the historical data and the second data subset is associated with feature values less than the feature value that partitions the historical data.

3. The computer-implemented method of claim 1, wherein generating the decision tree based on at least the portion of the information about the plurality of features further comprises:
   generating a next highest node in the decision tree, the next highest node being associated with the feature having the highest information gain;
   generating a first child node, of the next highest node, to represent the first data subset; and
   generating a second child, of the next highest node, to represent the second data subset.

4. The computer-implemented method of claim 3, further comprising:
   determining a first percentage of known illegitimate activities in the first data subset relative to total activities in the first data subset;
   associating the first child node with the first percentage;
   determining a second percentage of known illegitimate activities in the second data subset relative to total activities in the second data subset; and
   associating the second child node with the second percentage.

5. The computer-implemented method of claim 1, wherein identifying the node in the decision tree that satisfies the specified precision criteria further comprises:
   selecting a node that is associated with a percentage, of known illegitimate activities in a data subset represented by the node relative to total activities in the data subset that at least meets a threshold metric indicated by the specified precision criteria.

6. The computer-implemented method of claim 5, wherein the threshold metric corresponds to 90%.

7. The computer-implemented method of claim 1, wherein creating the rule based on the node further comprises:
   determining a path in the decision tree leading to the node, wherein the rule is created based on information about each node in the path in the decision tree leading to the node.

8. The computer-implemented method of claim 1, wherein the machine learning technique is associated with at least one of an information gain technique, a classification technique, a clustering technique, a decision tree classifier technique, a decision tree learning technique, a random forest technique, a logistic regression technique, a linear regression technique, or a gradient boosting technique.

9. The computer-implemented method of claim 1, further comprising:
   receiving one or more input parameters prior to acquiring the historical data; and
   generating a query based on the one or more input parameters, wherein the historical data is acquired using the query.

10. The computer-implemented method of claim 9, wherein the historical data is acquired based on a historical data context indicated by at least one of the one or more input parameters.

11. The computer-implemented method of claim 9, wherein the plurality of features included in the historical data is selected based on at least one of the one or more input parameters.

12. The computer-implemented method of claim 1, further comprising:
   formatting the historical data to be operable with the machine learning technique, prior to applying the machine learning technique to the historical data.

13. The computer-implemented method of claim 1, wherein the one or more illegitimate activities is associated with one or more fraudulent transactions occurring in a networked environment.

14. A system comprising:
   at least one processor; and a memory storing instructions that, when executed by the at least one processor, cause the system to perform:

acquiring historical data including a plurality of features associated with known legitimate activities and with known illegitimate activities, wherein at least some of the known legitimate activities and the known illegitimate activities include one or more financial transactions;

applying a machine learning technique to the historical data to gain information about the plurality of features associated with the known legitimate activities and with the known illegitimate activities;

generating a decision tree based on at least a portion of the information about the plurality of features;

identifying a node in the decision tree that satisfies specified precision criteria;

creating a rule based on the node identified in the decision tree, wherein the rule corresponds to a conditional rule which indicates that a particular activity is illegitimate when one or more features associated with the particular activity respectively meet one or more feature values specified by the rule; and identifying one or more illegitimate activities based on the rule, wherein applying the machine learning technique to the acquired historical data to gain the information about the plurality of features further comprises:

determining a respective information gain for each feature in the plurality of features;

identifying a feature having a highest information gain; and selecting a feature value, for the feature, that partitions the historical data into a first data subset and a second data subset, wherein the feature value is selected such that a largest possible amount of known legitimate activities is in the first data subset and a largest possible amount of known illegitimate activities is in the second data subset.

15. The system of claim 14, wherein either: 1) the first data subset is associated with feature values less than the feature value that partitions the historical data and the second data subset is associated with feature values greater than the feature value that partitions the historical data, or 2) the first data subset is associated with feature values greater than the feature value that partitions the historical data and the second data subset is associated with feature values less than the feature value that partitions the historical data.

16. A non-transitory computer-readable storage medium including instructions that, when executed by at least one processor of a computing system, cause the computing system to perform:

acquiring historical data including a plurality of features associated with known legitimate activities and with known illegitimate activities, wherein at least some of the known legitimate activities and the known illegitimate activities include one or more financial transactions;

applying a machine learning technique to the historical data to gain information about the plurality of features associated with the known legitimate activities and with the known illegitimate activities;

generating a decision tree based on at least a portion of the information about the plurality of features;

identifying a node in the decision tree that satisfies specified precision criteria;

creating a rule based on the node identified in the decision tree, wherein the rule corresponds to a conditional rule which indicates that a particular activity is illegitimate when one or more features associated with the particular activity respectively meet one or more feature values specified by the rule; and identifying one or more illegitimate activities based on the rule, wherein applying the machine learning technique to the acquired historical data to gain the information about the plurality of features further comprises:

determining a respective information gain for each feature in the plurality of features;

identifying a feature having a highest information gain; and selecting a feature value, for the feature, that partitions the historical data into a first data subset and a second data subset, wherein the feature value is selected such that a largest possible amount of known legitimate activities is in the first data subset and a largest possible amount of known illegitimate activities is in the second data subset.

17. The non-transitory computer-readable storage medium of claim 16, wherein either: 1) the first data subset is associated with feature values less than the feature value that partitions the historical data and the second data subset is associated with feature values greater than the feature value that partitions the historical data, or 2) the first data subset is associated with feature values greater than the feature value that partitions the historical data and the second data subset is associated with feature values less than the feature value that partitions the historical data.

* * * * *